Patented Dec. 8, 1936

2,063,669

UNITED STATES PATENT OFFICE 2,063,669

ASPHALT PAINT

Thomas C. Ford, Kankakee, Ill., assignor to American Asphalt Paint Co., Kankakee, Ill., a corporation of Illinois No Drawing. Application January 9, 1936, Serial No. 58,413

11 Claims. (Cl. 134—51)

This invention relates to an improved asphalt paint.

This application is a continuation in part of my co-pending application, Serial No. 716,436, filed March 19, 1934.

The problem of obtaining resistance to water and weather is extremely pressing in connection with asphalt paints. These paints are used generally under conditions under which other paints might not be expected to stand up, and while the present paints are in some instances of considerable value for such work, the need for greater water and weather resistance has always been present.

By the term "gas-proofed tung or oiticica oil" is meant an oil of this group which has been heat treated without the addition of gums to produce an oil which will dry under ordinary atmospheric conditions to a clear smooth film. Such a tung oil product is described in Reece Patent, No. 1,903,686.

Tung oil may likewise be produced having the same characteristics by the process of Dutch Patent 879, issued October 15, 1915. In this process, selenium or sulphur, selenides or sulphides, alone or mixed together, are added to the oil and the temperature raised to from 482° to 572° F. At 482° F. a reaction begins characterized by foaming. After one-half hour, the foaming stops and the reaction is complete. On cooling, the product has a golden-brown color and a consistency like that of honey.

Oiticica oil may likewise be treated according to this process or according to the Reece process.

The characteristics of the tung oil may be varied by varying the treatment to produce an acid number varying from, say, 3.5 to 8.57, or upward. The iodine number may be reduced from the original iodine number of the oil (which is usually about 165) to a considerably lower range, say to between 85 and 134. The specific gravity may be increased from the original gravity to .977. The refractive index of the treated oil will be between 1.4965 and 1.507. The viscosity will normally range from 23 to over 200. The saponification number will vary from about 187.4 to about 195.

The following are characteristic changes obtained by treating oiticica oil in accordance with this gas-proofing treatment:

I

| | Raw oil | Treated oil |
|---|---|---|
| Acid number | 3.32 | 3.56 |
| Iodine number | 143 | 122.6 |
| Viscosity | Semi-solid | 88 |
| Specific gravity | .967 | 1.00 |
| Saponification number | 187.67 | |
| Refractive index | 1.5180 | 1.4992 |

II

| | Raw oil | Treated oil |
|---|---|---|
| Acid number | 9.81 | 10.22 |
| Iodine number | 138 | 127.75 |
| Viscosity | Semi-solid | 71.5 |
| Specific gravity | .9722 | .9939 |
| Saponification number | 189.2 | 189.8 |
| Refractive index | 1.5155 | 1.5025 |

The above examples are typical of the change in treated oiticica oil. However, treated oiticica oil has been obtained from a raw oil, such as given in Example I, having a maximum acid number of 4, a minimum iodine number of 100, a maximum viscosity of 240, a maximum specific gravity of 1.001, a maximum saponification number of 188, and a minimum refractive index of 1.4980.

Maximum water and weather resistance is obtained by using a paint containing gilsonite and the gas-proofed tung or oiticica (or mixtures of the two) oil without the addition of any other drying oil, but it is found that while this combination is commercially usable, it is difficult to brush, and it is preferred to add a viscosity reducing drying oil. For this purpose it is found that perilla oil is particularly satisfactory. Other drying oils such as linseed, soya bean, sunflower seed, hempseed, menhaden, or sardine oil may be used instead of the perilla oil. The perilla oil, however, has considerably better drying properties than the other oils mentioned.

Gilsonite, when fluxed with raw tung or oiticica oil, gives an unstable liquid,—that is, one which will take on excessive body when aging, and one which is not gas-proof.

On the other hand, when gilsonite is fluxed with tung or oiticica oils which have been heat-treated with the additions of gums or resins in the ordinary fashion, the resulting paint becomes full of check marks and deteriorates rapidly, particularly upon exposure.

The use of the present type of oils, however, results in a paint which does not take on excessive body upon aging and at the same time does not check and deteriorate rapidly upon exposure.

Driers, such as lead, cobalt, or manganese oxide, or the like, may be incorporated to control the drying time of the finished paint. Thinning oils such as mineral spirits, solvent naphtha, or any good solvent for the gilsonite and the oils, may be incorporated to bring the paint to the desired consistency. This normally requires about 50% to 65% by weight of thinning oils.

As an example of the invention, 50 pounds of gilsonite and 10 pounds of perilla oil are heated to a temperature of 400° to 450° F. and are mechanically agitated until the gilsonite is completely fluxed by the perilla oil. Forty pounds of the "gas-proofed" tung or oiticica oil (or a mixture thereof) are then added and mechanically mixed until the oils and the gilsonite are completely incorporated into a homogeneous mass. Thinning oils may then be added to bring the paint to the desired consistency, which normally requires about 53% to 55% of the thinning oils. The driers may then be incorporated in the desired percentage.

The percentage of ingredients may, of course, vary within rather wide limits, depending upon the particular characteristics desired in the ultimate product. For example, the percentage of gilsonite in the paint base may vary from 10 to 80%, according to the intensity of the color and the hardness of the film desired. Normally this ratio will be between 25 and 60%. However, for water-proofing on certain interior surfaces it is desirable to have a much harder film, and for certain of such uses it may be desirable to increase the gilsonite to as much as 80%.

While the lower limit of 10% for the gilsonite is lower than will ordinarily be used, a satisfactory and durable paint may be made with as small a proportion of gilsonite as this by incorporating a small amount of carbon black, say 3½ to 5% by weight.

The percentage of tung or oiticica oil may likewise vary, but the higher the percentage thereof, the more durable will be the film produced. The preferred range is between 25 and 50% of either tung or oiticica oils, or a mixture thereof. However, the beneficial results of the combination of these gas-proofed oils with gilsonite are obtained over the entire range of gilsonite concentration given.

In the above percentages any difference is normally made up by a viscosity reducing oil such as perilla. In the absence of such an oil, however, the tung or oiticica oil may be used to complete the paint base.

Pigments such as iron oxide, or chrome green may be incorporated to produce paints of attractive colors and great durability.

A paint prepared in accordance with this invention not only has greater water and weather resisting properties, but is more resistant to acids and alkalis than a paint comprising gilsonite and a drying oil other than the gas-proofed tung oil.

The term film-forming constituents as used in the claims denotes those portions of the film which do not evaporate following application of the paint, but which remain to form the paint film.

The foregoing detailed description has been given for clearness of understanding only, and no unnecessary limitations should be understood therefrom, but the appended claims should be construed as broadly as permissible in view of the prior art.

I claim:

1. A paint base consisting essentially of gilsonite and a "gas-proofed" oil of the class consisting of tung and oiticica oils and mixtures thereof, the gilsonite being approximately 10 to 80% of the base and the "gas-proofed" oil or oils constituting 20 to 90% of the base.

2. A paint base consisting essentially of gilsonite and a "gas-proofed" oil of the class consisting of tung and oiticica oils and mixtures thereof, the gilsonite being approximately 25 to 60% of the base and the "gas-proofed" oil or oils constituting 40 to 75% of the base.

3. A paint base consisting essentially of gilsonite and a "gas-proofed" oil of the class consisting of tung and oiticica oils and mixtures thereof and a viscosity reducing drying oil, the percentage of gilsonite being approximately 25 to 60% and the "gas-proofed" oil or oils 25 to 40% of the base.

4. A paint base as set forth in claim 3, in which the viscosity reducing drying oil is perilla oil.

5. A paint base as set forth in claim 3, in which the gilsonite is approximately 50 parts, the viscosity reducing drying oil of the order of 10 parts and the "gas-proofed" oil or oils approximately 40 parts.

6. An asphalt paint consisting essentially of gilsonite, a "gas-proofed" oil of the class consisting of tung and oiticica oils and mixtures thereof, a metallic drier, and a thinner, the gilsonite being approximately 10 to 80% and the "gas-proofed" oil or oils 20 to 90% of the film forming constituents of the paint.

7. A paint as set forth in claim 6, in which the gilsonite is approximately 25 to 60% and the "gas-proofed" oil or oils 40 to 75% of the film forming constituents of the paint, and a thinner.

8. A paint base consisting essentially of gilsonite and a "gas-proofed" oil of the class consisting of tung and oiticica oils and mixtures thereof, the gilsonite being approximately 25 to 60% of the base and the "gas-proofed" oil or oils constituting 25 to 40% of the base.

9. A paint as set forth in claim 6, in which the gilsonite is approximately 25 to 60% and the "gas-proofed" oil or oils 25 to 40% of the film forming constituents of the paint, and a thinner.

10. An asphalt paint comprising gilsonite, perilla oil, "gas-proofed" tung oil, a thinner, and a minor proportion of a metallic drier, the gilsonite being approximately 50%, the perilla oil 10%, and the tung oil 40%, of the film-forming constituents of the paint, and the thinner being approximately 113% of the film-forming constituents.

11. An asphalt paint comprising gilsonite, perilla oil, "gas-proofed" oiticica oil, a thinner, and a minor proportion of a metallic drier, the gilsonite being approximately 50%, the perilla oil 10%, and the oiticica oil 40%, of the film-forming constituents of the paint, and the thinner being approximately 113% of the film-forming constituents.

THOMAS C. FORD.